(12) United States Patent
Dube et al.

(10) Patent No.: US 9,767,473 B2
(45) Date of Patent: Sep. 19, 2017

(54) METHOD AND APPARATUS FOR ECONOMIC EXPLOITATION OF WAITING TIME OF CUSTOMERS AT CALL CENTERS, CONTACT CENTERS OR INTO INTERACTIVE VOICE RESPONSE (IVR) SYSTEMS

(75) Inventors: Parijat Dube, Yorktown Heights, NY (US); Laura Wynter, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2201 days.

(21) Appl. No.: 11/673,457

(22) Filed: Feb. 9, 2007

(65) Prior Publication Data
US 2008/0195471 A1    Aug. 14, 2008

(51) Int. Cl.
G06Q 30/02    (2012.01)
H04M 3/50    (2006.01)

(52) U.S. Cl.
CPC ......... G06Q 30/0236 (2013.01); G06Q 30/02 (2013.01); H04M 3/50 (2013.01)

(58) Field of Classification Search
CPC .. H04M 3/51; H04M 3/5183; G06Q 30/0273; G06Q 30/0241; G06Q 30/0269
USPC ............ 379/266.01, 265.02, 76, 309, 142.01
See application file for complete search history.

(56) References Cited

U.S. PATENT DOCUMENTS

| | | | |
|---|---|---|---|
| 4,850,007 A | 7/1989 | Marino et al. | |
| 5,652,784 A | 7/1997 | Blen et al. | |
| 5,734,702 A | 3/1998 | Sugimura | |
| 5,742,675 A * | 4/1998 | Kilander et al. | 379/266.09 |
| 5,992,888 A * | 11/1999 | North et al. | 283/56 |
| 6,757,662 B1 | 6/2004 | Greenwald et al. | |
| 6,782,417 B1 | 8/2004 | Rao | |
| 6,842,767 B1 | 1/2005 | Partovi et al. | |
| 6,889,054 B2 | 5/2005 | Himmel et al. | |
| 6,937,699 B1 | 8/2005 | Schuster et al. | |
| 6,977,997 B2 | 12/2005 | Shioda et al. | |
| 7,006,606 B1 | 2/2006 | Cohen et al. | |
| 7,760,867 B2 * | 7/2010 | Walker et al. | 379/266.01 |
| 2001/0056369 A1 * | 12/2001 | Takayama et al. | 705/14 |
| 2002/0018554 A1 * | 2/2002 | Jensen et al. | 379/265.01 |
| 2002/0162111 A1 * | 10/2002 | Shimizu et al. | 725/87 |
| 2003/0058707 A1 * | 3/2003 | Dilger et al. | 365/200 |
| 2003/0112927 A1 * | 6/2003 | Brown et al. | 379/67.1 |
| 2004/0128192 A1 * | 7/2004 | Paluszek et al. | 705/14 |
| 2006/0277550 A1 * | 12/2006 | Williams et al. | 718/107 |
| 2007/0073584 A1 * | 3/2007 | Grouf et al. | 705/14 |
| 2007/0116227 A1 * | 5/2007 | Vitenson et al. | 379/207.02 |
| 2007/0211879 A1 * | 9/2007 | Shaffer et al. | 379/265.01 |
| 2007/0269031 A1 * | 11/2007 | Honig et al. | 379/142.01 |

* cited by examiner

*Primary Examiner* — Ahmad F Matar
*Assistant Examiner* — Jirapon Intavong
(74) *Attorney, Agent, or Firm* — Daniel P. Morris; McGinn IP Law Group, PLLC

(57) ABSTRACT

A structure and method includes a detector to determine that a caller is waiting for service. A presentation module presents an advertisement to the waiting caller, wherein a compensation is paid to have the advertisement presented to the waiting caller.

18 Claims, 4 Drawing Sheets

METHOD AND APPARATUS FOR ECONOMIC EXPLOITATION OF WAITING TIME OF CUSTOMERS AT CALL CENTERS, CONTACT CENTERS OR INTO INTERACTIVE VOICE RESPONSE (IVR) SYSTEMS

BACKGROUND OF THE INVENTION

Field of the Invention

The present invention generally relates to scenarios in which customers have to wait for service. More specifically, in non-limiting exemplary embodiments, waiting customers in such environments as call centers and Interactive Voice Response (IVR) systems are selectively presented with advertisements in a manner that revenues can be generated.

Description of the Related Art

Typically, call centers or IVR systems play music, provide some information about online sales or help sites, provide information about other related products of the same company or play some prerecorded message like "Your call is important to us. Please wait and your call will be answered in the order it was received" etc.

The present inventors have recognized that such waiting time potentially could be used to profitably utilize waiting time in scenarios such as call centers and IVR systems.

SUMMARY OF THE INVENTION

In view of the foregoing, and other, exemplary problems, drawbacks, and disadvantages of the conventional systems, it is an exemplary feature of the present invention to provide a structure (and method) in which time when the customers wait for service in scenarios such as a call center or any Interactive Voice Response (IVR) system can be utilized for making profitable use of the wait time of customers.

It is another exemplary feature of the present invention to provide a structure and method for a system in which advertisements are selectively presented to waiting customers, which selection can be based on such factors as characteristics of each customer and characteristics of each available waiting time slot.

Therefore, in a first exemplary aspect of the present invention, described herein is an apparatus including a detector to determine that a caller is waiting for service, and a presentation module to present an advertisement to the waiting caller, wherein a compensation is paid to have the advertisement presented to the waiting caller.

In a second exemplary aspect of the present invention, also described herein is a method of utilizing call waiting time as a source of revenue, including detecting that a caller is waiting for service, and presenting an advertisement to the waiting caller, wherein a compensation is paid to have the advertisement presented to waiting callers.

In a third exemplary aspect of the present invention, also described herein is a method of managing at least one of a call center, a contact center, and an Interactive Voice Response (IVR) system, including detecting that a client is waiting for service and presenting an advertisement to the waiting client, wherein a compensation is paid to have the advertisement presented to waiting clients.

Thus, the present invention provides a method to raise additional revenue in a call center, contact center, or IVR system environment by recognizing that this environment is a valuable resource for advertisers looking for new, innovative, and more effective ways to sell their products and services. For such systems already in place, the present invention can increase revenue at negligible cost.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
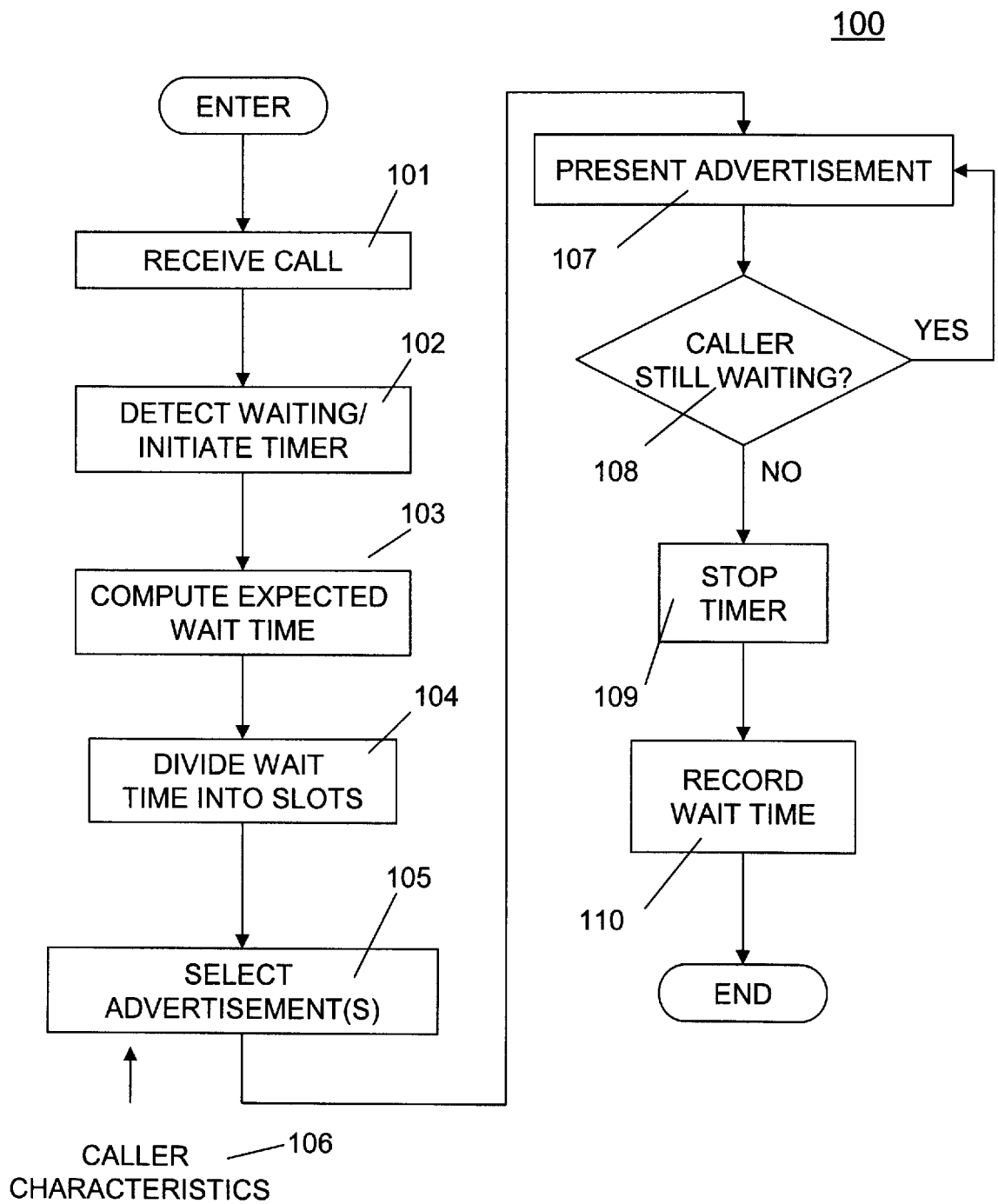
FIG. 1 shows a flowchart 100 of the method of an exemplary embodiment of the present invention.

Referring now to the drawings, and more particularly to FIGS. 1-4, exemplary embodiments will now be described.

The present invention provides a method and mechanism so that waiting time can serve as a basis for revenue. FIG. 1 shows an exemplary basic flowchart 100 of the process that demonstrates exemplary principles of the present invention.

In step 101, a call is received, and, as is already well known in the art, since it can be detected that the caller will be waiting, in step 102, a timer is initiated for that incoming call. The expected wait time is computed in step 103, using analytical methods such as those discussed shortly. The wait time is then divided into intervals, or slots, in step 104, which slots have been sold to advertisers, much as pop-up ads are sold to internet advertisers, or air-time is sold to television and radio advertisers. The ads are then selected in step 105, perhaps based at least in part on detecting caller characteristics 106.

In step 107, the first slot advertisement is presented to the caller. At the end of the first advertisement, it is determined in step 108 whether the caller is still waiting. If so, step 107 is repeated with the second selected ad. This procedure is repeated until it is determined that the caller is no longer waiting. At that point, the timer is stopped in step 109 and the wait time can be recorded in step 110 to become an entry into the waiting time history data.

Figure 2:
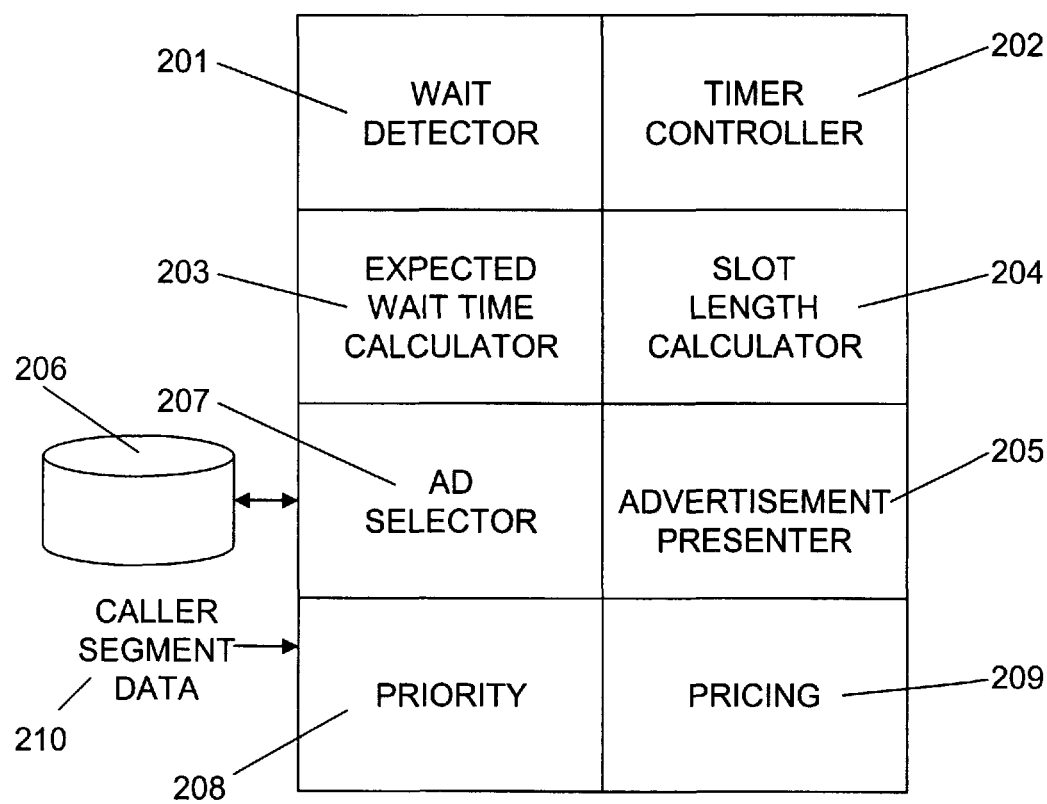
FIG. 2 shows an exemplary block diagram of modules of an exemplary embodiment of the present invention.
Figure 3:
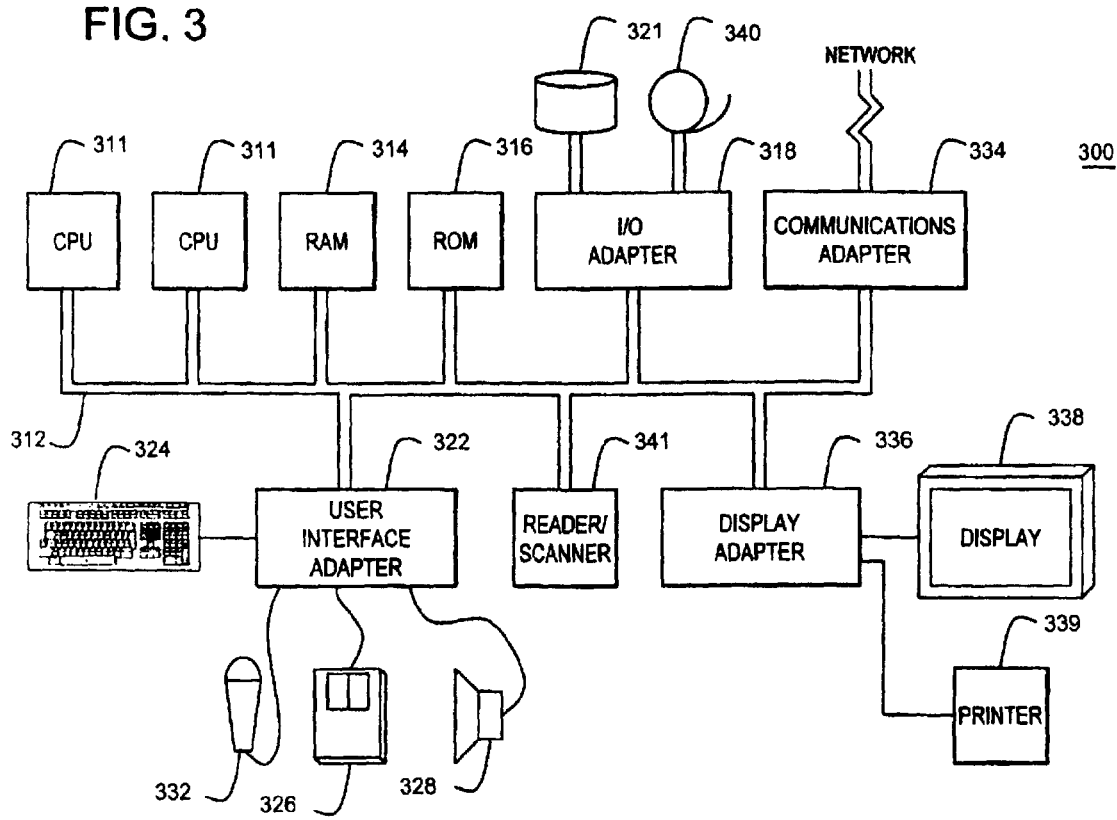
FIG. 3 illustrates an exemplary hardware/information handling system 300 for incorporating the present invention therein.

As demonstrated in the exemplary block diagram 200 shown in FIG. 2, key components of the invention include a module 201 for detecting a caller is waiting, a timer controller 202 to start a timer for a detected waiting caller, and expected wait time calculator module 203 for the computation of expected waiting time of customers calling into an IVR system or a call center, a module 204 for the computation of slot length, and a module 205 for the placing of advertisements in those slots. Database 206 contains various advertisements prepared in advance for presentation to callers, and the exemplary embodiment contains a selection module 207 for selecting which ad is presented to any given caller at any given waiting slot, based on inputs from priority module 208.

An additional important feature of the present invention is that, based on the models used for computing expected wait time of customers, the slots can be effectively prioritized and pricing done accordingly. Therefore, module 208 provides one or more prioritization algorithms as inputs into the selection module 207 and the pricing module 209, which has the function of tracking charges for the various clients having ads stored in database 206. In the context of the present invention, "priority" means both a priority in the sense of which time slots are relatively more important but also includes a priority in selection of ads as based on what is known or can be deduced about the caller, including, for example, the reason for the call itself.

As briefly mentioned previously, another exemplary feature of the present invention is the use of customer segment data 210 to be used in the selection of appropriate advertisements and becoming one of possible inputs into the selection and prioritization modules 207, 208.

The present invention includes using models of expected wait time of callers into an IVR system or a call center. Different methods can be incorporated for calculating the expected waiting time of customers. For example, static methods based on historical data for estimating the expected waiting time, or waiting time distribution using some parametric or non parametric methods can be used. Dynamic methods that update the wait time statistics, based on on-line observation of waiting time patterns of customers, can also be used, either alone or in combination with one or more static methods. The waiting time statistics can also have parameters capturing the sensitivity of waiting time to other determinants, such as time of day, customer specific characteristics, perceived-value of service offering, etc. The system can also be modeled as a queuing network, and this queuing model used for calculating waiting time statistics.

Another parameter that can be used in exemplary embodiments is average waiting time of customers. One possible approach to estimate the average waiting time of customers is by maintaining a moving average of waiting times. The estimate can be updated whenever a customer finishes service and leaves the system. An exemplary way to implement the average wait time estimation based on this approach is through a low pass filter with an exponential weighted moving average, and one possible algorithm to implement this is given in the code segment below:

```
Let,
    wait_time = waiting time of the most recent customer who
    finished service;
    avg_wait_time = average waiting time estimate;
    time = current time;
    queue_idle_time = start of the queue idle time (when there are no
    more customers waiting for service);
    wt= exponential weight; and
    f(x)= a linear function in x.
Start
    avg_wait_time = 0
    whenever a customer finishes service and leaves the system
        update the average waiting time estimate
            if the queue of customers waiting is non-empty
                avg_wait_time = (1−wt)*avg_wait_time +
                wt*wait_time
            else
                when a new customer update avg_wait_time as
                m = f(time − queue_idle_time)
                avg_wait_time = (1−wt)^m * avg_wait_time
            end
        end
    end
    when the queue of customers is empty
        queue_idle_time = time
    end
Stop
```

Based on that data, using probability formulae such as queuing models or some other means, the expected length of each interval is calculated, along with the probability that a customer is still on the line during that interval. It is equally possible to use approximate means, but the present invention provides a detailed means of precisely computing these parameters.

The likelihood that a caller will remain on the line during each slot can then be computed. The simplest way to do this is to define slot lengths a priori. Then, using the expected interval length, the likelihood that a user is on the line during each slot can be directly obtained from, for example, historical data.

For example, if data shows an expected interval is of length 4 minutes with 95% probability, and, supposing that the a priori slots are defined as 1 minute in length, then this statistic means that the user will be on the line for the first 4 slots with 95% probability. Most likely, the probability that the user is on the line during, for example, the first two slots, would be higher, such as 99%, and may be at 95% for one-minute slots numbered 3 and 4. On the other hand, the likelihood that a user is still on the line during the $5^{th}$ minute would be lower, and still lower for the $6^{th}$ minute.

Hence, slots later in the waiting period have lower value to an advertiser. These probabilities can be computed through the methods described above used in determining expected interval length and probability can be one factor in ad pricing.

A more complex but potentially more valuable way of defining slot lengths is to allow them to vary, rather than a fixed a priori length just discussed. For instance, the first slot, as it is the most valuable, can be longer, thereby increasing total revenue gained from the advertisements, if length is a factor in ad pricing. Later slots, of lower value since callers have less likelihood of remaining on the line, can be shorter in length and sold more cheaply. Therefore, the definition of the slot lengths can be a function of the total interval length and/or other characteristics, such as time of day (callers may be more patient in the evening than during business hours), day of the week (callers may be more patient on the weekend) or even can depend on characteristics of the caller (such as approximate age).

An exemplary algorithm for determining such slot lengths might proceed as follows:

1. Determine desired length of advertisements from advertisers. Let those lengths be L1, L2, . . .

2. If an average expected waiting time is N minutes, then in order to accommodate the advertiser that wishes to pay for advertising in the first slot (which has the highest likelihood of a listener remaining on the call), and supposing that the length of that advertiser's advertisement is L1, and provided that N is no smaller than L1, then divide the first slot into length L1. The remaining expected available time is N−L1.

3. Take the length of the advertiser wishing to pay for the second slot (which may cost less than the first slot). If that length is L2, and provided that N−L1 is no smaller than L2, then allocate advertiser 2 to the second slot, and the remaining expected time is N−L1−L2.

4. In the event that the remaining time is not sufficient to accommodate the advertisement of the advertiser wishing to be in that slot, the slot can be used by the next advertiser on the list.

5. Continue as above until not enough time remains to allocate to any advertiser.

In short, in this exemplary embodiment, advertising positioning can be valued as a function of the likelihood that the user is still on the line, as well as other characteristics (before or after a complementary advertisement, for example).

Similarly, it is possible for the user to be held on the line to enable the advertisement to complete, rather than being immediately connected to an available service agent. This feature represents an added value for the advertiser and hence a guaranteed exposure (short of the user hanging up) and would increase the value of that advertising slot, hence allowing it to be sold at a higher price.

The slots may be further customized, not only by the likelihood that the caller will remain on the line during that slot, but also by data automatically obtained about the customer. In this aspect of the present invention, data that can be readily obtained by an IVR or call center might include, for example, the caller's telephone number, which may in some cases indicate location, the caller's sex, accent, approximate age (e.g., all obtained using voice recognition technology), and, if the caller enters any information by voice or by the keypad, such entry may indicate further data about the caller, especially if a database record of the caller is already on file.

Given the available characteristics, the advertisement choice can be further refined to the caller. For example, if the caller is a woman of middle age, advertisements targeted to that demographic segment can be selected. This provides an added benefit to the advertiser, since most other media, from print to television to internet, cannot target explicitly the characteristics of the caller. That is, media can target certain demographics implicitly by the fact that a particular demographic chooses one or another magazine, television program, etc., but not with the certainty that the advertisements discussed herein can accomplish, because of the inherent nature of individual contact.

Using this information, it is possible to sell advertisers the use of these slots, since the advertisers can be assured of individual contact and an aspect of priority based upon personal characteristics and relative time slots.

Thus, in summary, data can be identified about the caller and may include, but is not limited to, such factors as the customer's calling location (obtainable in some cases from the telephone number), the customer's sex (obtainable automatically through voice recognition), or data that the customer may have keyed into the IVR system.

The pricing of the advertising slots may be a function of several factors, including the likelihood that the customer is still on the line, whether or not a guaranteed exposure is provided, as well as the customer characteristics and whether or not the advertisement is only played for designated demographics. As mentioned above, the present invention includes the capability of tracking pricing charges for each client as advertisements are presented to callers, as well as the capability of a pre-set pricing structure based upon selling slots and priorities in advance, or a combination thereof. It should also be noted that compensation for presenting the advertisement slots to callers would typically be payments by the advertiser to the provider/operator of the call centers and Interactive Voice Response (IVR) systems, etc., as previously agreed upon. However, compensation might also include other creative forms of payments, such as agreements for return services, products, rebates, etc.

Exemplary Hardware Implementation

Figure 4:
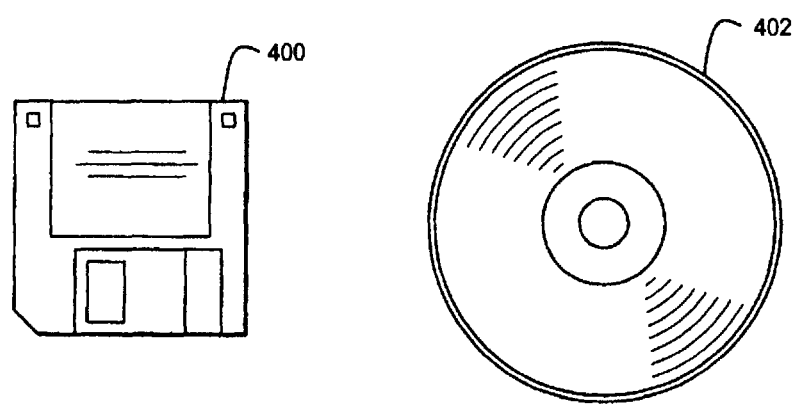
FIG. 4 illustrates a signal bearing medium 400 (e.g., storage medium) for storing steps of a program of a method according to the present invention.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Thus, the present invention has the benefit of increasing revenue accrued to call center providers as well as any entity that makes use of an Interactive Voice Recognition (IVR) system, in which calls are taken by a computer and routed after the caller keys in some data about the caller or about the call. Presently, the waiting time that a caller experiences when using call centers or IVR is not exploited fully, if at all, in terms of revenue potential. The present invention demonstrates a way to create additional revenue from the sheer fact that a call center or IVR system is in place, and the willingness of advertisers to find new, innovative, and more effective ways to sell their products and services. Hence, a benefit to the user of the present invention is an increase in revenue at negligible cost.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
   a detector to determine that a caller is waiting for service;

a timer that is initiated when said caller is detected as waiting, said timer being stopped when said caller is detected as no longer waiting, wherein a waiting time of said caller, as measured by said timer, is stored as waiting time data;

a calculator, as executed by a processor on a computer, to calculate an estimated waiting time for said caller;

a presentation module to present an advertisement to said waiting caller; and a selection module to select said advertisement presented to said caller from a plurality of advertisements available for presentation to callers, wherein said calculator divides said estimated waiting time into a plurality of slots, said selected advertisement being presented to said caller in a first slot of said plurality of slots, wherein a compensation is provided to have said advertisement presented to the waiting caller, wherein said selection module makes a selection based upon a priority that is determined based upon:
  a relative importance of slots of said plurality of slots; and
  a relative importance of presenting a specific advertisement based on what is known or can be deduced about said caller, wherein a price that an advertiser pays is based at least in part upon said priority, and wherein said waiting time data is used for calculation of a likelihood that a caller will continue to wait, including a likelihood that a caller will remain waiting for each time slot.

2. The apparatus of claim 1, wherein additional advertisements are respectively selected and presented in subsequent slots, as based on said priority.

3. The apparatus of claim 1, wherein said determination of said priority further incorporates one or more of:
  a probability that a caller will continue waiting throughout a duration of an advertisement slot; and
  a length of said advertisement.

4. The apparatus of claim 1, further comprising a memory device storing a plurality of advertisements that can be selectively presented to callers during waiting periods.

5. A non-transitory signal-bearing storage medium tangibly embodying a program of machine-readable instructions executable by a digital processing apparatus to perform as said apparatus of claim 1.

6. The apparatus of claim 1, wherein said waiting time data is used for calculating a sensitivity of waiting time for at least one of a time of day, customer specific characteristics, and a perceived value of service offering.

7. The apparatus of claim 1, wherein said likelihood that a caller will continue to wait is used to calculate at least one of:
  a length of time slots used for presenting said advertisements to waiting callers; and
  a priority of advertisements related for said time slots.

8. The apparatus of claim 1, wherein said calculator that divides said estimated waiting time into said plurality of slots further calculates a number of said slots, each said slot having a substantially same length.

9. The apparatus of claim 1, wherein said calculator that divides said estimated waiting time into said plurality of slots calculates said slots based on a remainder of said estimated waiting time after a completion of each presented advertisement.

10. The apparatus of claim 9, wherein successive selections are made and presented to said caller, based upon fitting an appropriate advertisement into said remainder, as calculated after each presented advertisement completion.

11. The apparatus of claim 9, wherein said slots are calculated further in consideration of one or more of a time of day, a day of week, and at least one characteristic of the caller.

12. A method of utilizing call waiting time as a source of revenue, said method comprising:
  detecting that a caller is waiting for service;
  calculating an expected waiting time for said waiting caller;
  automatically dividing said estimated waiting time into a plurality of time slots by a process of selecting and presenting an advertisement to said waiting caller, as performed by a processor on a computer, based on a selection priority and said expected waiting time, said selection priority being determined based upon:
    a relative importance of each time slot of said plurality of time slots; and
    a relative importance of presenting a specific advertisement based on what is known or can be deduced about said caller;
  at an end of each said advertisement presentation, determining whether said caller is still waiting;
  if it is determined that said caller is still waiting, selecting and presenting, as based on said selection priority and a residual of said expected waiting time, another advertisement to said waiting caller in each of successive time slots for as long as said caller is determined to still be waiting; and
  if it is determined that said caller is no longer waiting, storing data for said caller's waiting for service,
  wherein a compensation is paid to have said advertisement presented to waiting callers to a provider/operator, by advertisers desiring to have their advertisements presented to callers that call said provider/operator for services.

13. The method of claim 12, wherein said determination of said selection priority further includes consideration of one or more of:
  a probability that a caller will continue waiting throughout a duration of an advertisement slot; and
  a length of said advertisement.

14. The method of claim 12, wherein said expected waiting time is calculated using a static method based on at least one of historical data and a waiting time distribution characteristic.

15. The method of claim 12, wherein said expected waiting time is calculated using a dynamic method based on updating wait time statistics.

16. The method of claim 15, wherein said expected waiting time is calculated using a moving average of actual waiting times.

17. A method of operating at least one of a call center, a contact center, and an Interactive Voice Response (IVR) system, said method comprising:
  detecting that a client is waiting for service;
  calculating an expected waiting time for said client's service wait and dividing said expected waiting time into slots of time for advertising; and
  selecting and presenting, in each said slot of time, an advertisement to said waiting client, as executed by a processor on a computer, and as based on a selection priority, said selection priority being determined based upon:
    a relative importance of said slots; and a relative importance of presenting a specific advertisement based on what is known or can be deduced about said caller, wherein a compensation is paid to a provider/operator of said call center, contact center, or IVR system to have said advertisement presented to waiting clients.

18. The method of claim 17, wherein said priority is further determined based on one or more of:

a probability that a client will continue waiting throughout a duration of an advertisement slot; and a length of said advertisement.

* * * * *